(12) United States Patent
Shiraishi et al.

(10) Patent No.: US 7,221,719 B2
(45) Date of Patent: May 22, 2007

(54) APPARATUS AND METHOD FOR RECEIVING BS DIGITAL BROADCAST

(75) Inventors: Kenichi Shiraishi, Yokohama (JP); Shoji Matsuda, Kawasaki (JP); Akihiro Horii, Zama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 1236 days.

(21) Appl. No.: 10/031,085

(22) PCT Filed: May 17, 2001

(86) PCT No.: PCT/JP01/04125

§ 371 (c)(1),
(2), (4) Date: Jan. 16, 2002

(87) PCT Pub. No.: WO01/91394

PCT Pub. Date: Nov. 29, 2001

(65) Prior Publication Data

US 2002/0106036 A1    Aug. 8, 2002

(51) Int. Cl.
*H04L 27/14* (2006.01)
(52) U.S. Cl. .................. 375/326; 375/332
(58) Field of Classification Search ............ 375/329, 375/326, 331, 332; 329/304, 306
See application file for complete search history.

(56) References Cited

U.S. PATENT DOCUMENTS 5,696,797 A    12/1997   Bucher et al.
6,683,921 B1 *  1/2004   Shiraishi et al. ............ 375/331

FOREIGN PATENT DOCUMENTS

JP    11-163957    6/1999

(Continued)

OTHER PUBLICATIONS

Supplementary European Search Report dated Jan. 19, 2004.
P. Fines et al., Fully Digital M-ary PSK and M-ary QAM Demodulators for Land Mobile Satellite Communications, Electronics & Communication Journal, vol. 3, No. 6, pp. 291-298, Dec. 1991.

(Continued)

*Primary Examiner*—Kevin Kim
(74) *Attorney, Agent, or Firm*—Eric J. Robinson; Robinson Intellectual Property Law Office, P.C.

(57) ABSTRACT

An improved apparatus for receiving BS digital broadcast is disclosed. The apparatus for receiving BS digital broadcast of the present invention has first to third filters and a selective complex calculator circuit.

Each of the first to third filters 18 to 20 identifies the modulation technique applied to the received signal, by the modulation identification signals A0, A1 received from a timing generator circuit 25, and filters a phase error signal PED according to the identified modulation technique. The selective complex calculator circuit 21 shifts the phase of a signal point indicated by an I signal ADI1 and a Q signal ADQ1 absolute-phased by an absolute-phasing section 14, by a phase corresponding to the phase error signal filtered by the first to third filters 18 to 20. At this moment, the selective complex calculator circuit 21 selects the phase error signal corresponding to the modulation technique identified from the modulation identification signals A0, A1 received from the timing generator circuit 25. Consequently, in the burst receiving, it is possible to reduce the effect on the error rate because of the signal noise of the ODU to a degree equal to that in the continuous receiving.

7 Claims, 4 Drawing Sheets

FOREIGN PATENT DOCUMENTS

| | | |
|---|---|---|
| JP | 11-341092 | 12/1999 |
| JP | 2000-307670 | 11/2000 |
| WO | WO 99/29075 | 6/1999 |
| WO | WO 00/18077 | 3/2000 |

OTHER PUBLICATIONS

A. Horii et al., "Practical Design of Receiver for Satellite Digital Broadcasting", Digest of Technical Papers, International Conference on Consumer Electronics, 1998, vol. 1998, pp. 68-69.

* cited by examiner

APPARATUS AND METHOD FOR RECEIVING BS DIGITAL BROADCAST

TECHNICAL FIELD

This invention relates to an apparatus for receiving BS digital broadcast suitable for the receiving of the BS digital broadcast, and more particularly, relates to an apparatus for receiving BS digital broadcast by which a stable receiving operation is possible.

BACKGROUND ART

The apparatus for receiving BS digital broadcast for receiving the BS (Broadcasting Satellite) digital broadcast receives a signal transmitted by the time sharing by using a plurality of modulation techniques of multi-phase PSK modulations such as 8 PSK (Phase Shift Keying) modulation, QPSK (Quadrature PSK) modulation, or BPSK (Binary PSK) modulation in the way of time sharing. The apparatus for receiving BS digital broadcast regenerates the carrier by detecting the phase error of the received signal, and demodulates the digital signal.

Conventionally, the apparatus for receiving BS digital broadcast which regenerates the carrier by using a single demodulator circuit switches the receiving operation according to the magnitude of the CNR in the received signal. For example, when the CNR is large (at the time of a high CNR), it performs continuous receiving while responding all modulation techniques, and detects the phase error and regenerates the carrier. On the other hand, when the CNR is approximately in the middle degree (at the time of a medium CNR), it performs burst receiving of a signal subjected to the QPSK modulation and a signal subjected to the BPSK modulation and detects the phase error, and regenerates the carrier. Furthermore, when the CNR is small (at the time of a low CNR), it performs burst receiving of a signal subjected to the BPS modulation and detects the phase error, ad regenerates the carrier.

FIG. 3 is a drawing indicating one example of the structure of such a conventional apparatus for receiving BS digital broadcast.

Here, when performing the burst receiving of a signal, for example, such an operation of holding the output of a loop filter 106 during the term when a signal which cannot detect the phase error arrives is performed.

Furthermore, The apparatus for receiving BS digital broadcast switches the receiving operation according to a switching instruction signal generated by a decoding section 109.

The decoding section 109 monitors the error rate or the like after performing the trellis decoding or the like (Viterbi decoding in the case of QPSK or BPSK), and when the error rate or the like becomes a previously determined value, it generates a switching instruction signal for instructing the switching of the receiving operation.

PROBLEMS TO BE SOLVED BY THE INVENTION

In the above described conventional apparatus for receiving BS digital broadcast, in the case where the performance of a frequency converter of the outdoor unit (general term made by integrally grasping an antenna and a down converter) is not sufficient, when the receiving operation is switched, the limit CNR may change, which is the point where the correction becomes impossible when the demodulated digital signal is coded to a connected code or the correction is performed by an error correction code.

FIG. 4 shows the limit CNR characteristic at the time of continuous limit receiving of 8PSK and BPSK to the phase noise characteristic of a local oscillator of the down converter in the outdoor unit (ODU).

According to this, the limit CNR characteristic a of the 8PSK and the limit CNR characteristic c of the BPSK in the continuous receiving at the time of a high CNR change to the limit CNR characteristics b, d in the burst receiving at the time of a medium CNR, respectively.

Therefore, the CNR at the switching point when switching the receiving operation is different, and there has been such a problem that a hysteresis is caused in the receiving operation.

From this point of view, it is also considered to detect the degree of the phase noise of the ODU or the like, since the fluctuation of the CNR at the switching point is affected by the phase noise of the ODU or the like, but this is technically very difficult. Furthermore, even if that can be detected, it is not sure to prevent all hystereses from occurring.

This invention is made due to the above described actual situation, and it is an object to provide an apparatus for receiving BS digital broadcast by which the stable receiving operation is made possible.

DISCLOSURE OF THE INVENTION

In order to attain the above described object, the apparatus for receiving BS digital broadcast of the present invention operates such that when it regenerates the carrier by the carrier regeneration loop and establishes the phase synchronization and decodes the PSK modulation signal regenerated from the modulated signal to a digital signal, it shifts the phase of a signal point indicated by the PSK modulation signal outputted from the carrier regeneration loop, by the phase determined on the basis of the type of the PSK modulation technique applied to the received signal and the phase error contained in the PSK modulation signal, and then, it decodes the digital signal, and performs burst receiving only in a specified signal interval, and regenerates the carrier on the basis the detected phase error.

According to the present invention, it is possible to shift the phase of the signal point indicated by the PSK modulation signal outputted from the carrier regenerating loop, by the phase determined on the basis of the type of the PSK modulation technique applied to the received signal and the phase error contained in the PSK modulation signal. Consequently, in the burst receiving, it is possible to reduce the effect on the error rate because of the phase noise of the ODU, and the stable receiving operation becomes possible by performing the burst receiving at all times regardless of the magnitude of the CNR and regenerating the carrier.

More particularly, in the case of the apparatus for receiving BS digital broadcast of the present invention, the carrier regenerating means comprises: a waveform data generator circuit for generating waveform data indicating the regenerated carrier; a complex calculator circuit for performing complex calculation of waveform data generated by the above described waveform data generator circuit and a PSK modulation signal regenerated from the modulated signal; a band limiting filter for limiting a band of a PSK modulation signal in which the phase of a signal point is adjusted by complex calculation of the above described complex calculator circuit; a latch circuit for latching a PSK modulation signal in which the band is limited by the above described band limiting filter; an error detector circuit for detecting a phase error by comparing the phase of a signal point indicated by a PSK modulation signal latched by the above described latch circuit with an absolute phase; and a loop filter for smoothing an error signal indicating the magnitude of a phase error detected by the above described error detector circuit, and for supplying it to the above described waveform data generator circuit.

Furthermore, it has a plurality of filter circuits for filtering the error signal indicating the magnitude of the phase error detected by the above described error detector circuit only in the signal interval corresponding to the type of the PSK modulation technique applied to a received signal, and is characterized in that the above described phase shift means shifts the phase of a signal point indicated by the PSK modulation signal, by a phase corresponding to the error signal filtered by the above described plurality of filter circuits.

Furthermore, more preferably, the above described decoding means has control data decoding means for decoding data indicating the multiplex structure of a frame formed by the decoded digital signal from a PSK modulation signal, and identification signal generating means for generating a modulation identification signal indicating the PSK modulation technique applied to a received signal identified by data decoded by the above described control data decoding means, and the above described plurality of filter circuits receive the modulation identification signal generated by the above described identification signal generating means and identify the type of the PSK modulation technique applied to a received signal, and the above described phase shift means selects the error signal filtered by the above described plurality of filter circuits, according to the PSK modulation technique identified from the modulation identification signal generated by the above described identification signal generating means, and shifts the phase of a signal point indicated by the PSK modulation signal, by a phase corresponding to the selected error signal.

Furthermore, the apparatus of the present invention has pattern detecting means for detecting a frame synchronization pattern from the PSK modulation signal in which the phase is shifted by the above described phase shift means, and is characterized in that the above described absolute-phasing means absolute-phases the PSK modulation signal, according to whether the frame synchronization pattern detected by the above described pattern detecting means is reversed.

The present invention can also be grasped as a method for receiving digital broadcast.

In that case, the method for receiving BS digital broadcast of the present invention is characterized in that it comprises: a step of regenerating a carrier by a carrier regenerating loop and establishing synchronization; a step of decoding a digital signal from a PSK modulation signal; a step of decoding a digital signal after shifting the phase of a signal point indicated by the PSK modulation signal outputted from the above described carrier regenerating loop, by a phase determined on the basis of the type of a PSK modulation technique applied to a received signal and the phase error contained in the PSK modulation signal; and a step of regenerating a carrier on the basis of a phase error detected by performing burst receiving only in a specified signal interval.

BEST MODE FOR CARRYING OUT THE INVENTION

An apparatus for receiving BS digital broadcast according to an embodiment of this invention will be described below in detail by referring to drawings.

This apparatus for receiving BS digital broadcast receives an In-phase signal I0 and a Quadrature-phase signal Q0 of the base band outputted by subjecting the BS-IF (Broadcasting Satellite-Intermediate Frequency) signal that is a modulated signal made of a received radio wave down converted by an outdoor unit (ODU) or the like, to quasi-synchronous detection with a quadrature detector. Each of the In-phase signal I0 and the Quadrature-phase signal Q0 received by this apparatus for receiving BS digital broadcast is a PSK (Phase Shift Keying) modulation signal including an In-phase component and a Quadrature-phase component of a carrier included in the modulated signal. Hereafter, for the sake of convenience, the In-phase signal is called an I signal and the Quadrature-phase signal is called a Q signal.

In the case of the BS digital broadcast, the frame is constructed in such a way where a specified number of symbols is a unit, and a hierarchical modulation technique is used in the way of time sharing, which is made by combining a plurality of modulation techniques with different necessary CNR values such as TC8PSK (Trellis Coded 8PSK) modulation, QPSK (Quadrature PSK) modulation, and BPSK modulation. Furthermore, into the digital signal transmitted by the BS digital broadcast, a burst symbol is inserted, which makes the demodulation possible when a CNR (Carrier-to-Noise Ratio) is small (at the time of a low CNR).

Figure 1:
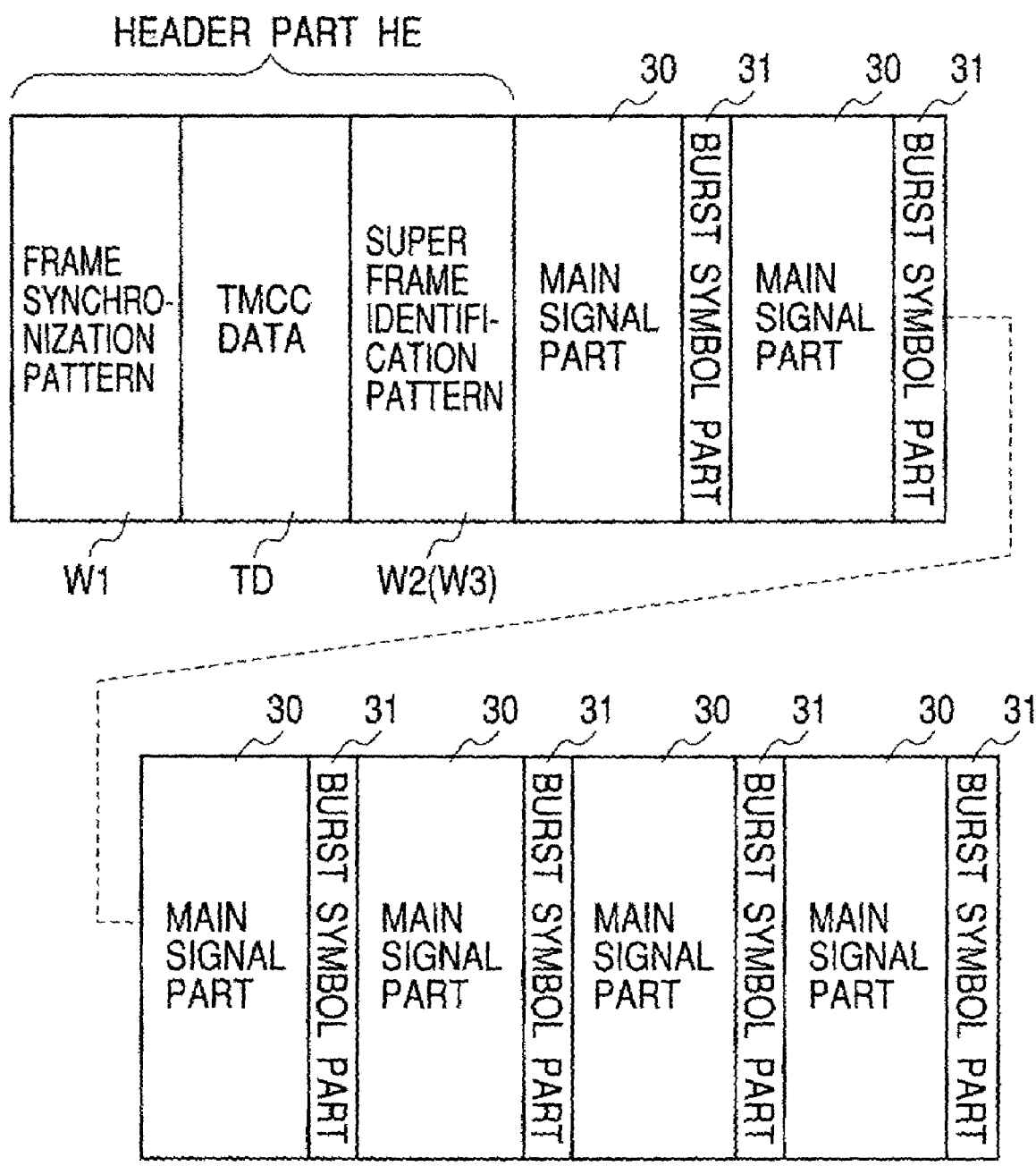
FIG. 1 is a drawing exemplifying the frame structure in the hierarchical modulation technique.

FIG. 1 is a drawing exemplifying the frame structure in the hierarchical modulation technique used in the BS digital broadcast.

In the case of the frame indicated in FIG. 1, one frame is made up of 39936 symbols, and it includes a header part HE made of 192 symbols, a main signal part 30 of 203 symbols constructed as a plurality of pairs, and a burst symbol part 31 of four symbols.

The header part HE includes a frame synchronization pattern W1, TMCC (Transmission and Multiplexing Configuration Control) data TD, and a super frame identification pattern W2 (or W3).

The frame synchronization pattern W1 uses specified 20 bits among 32 bits and it is one for transmitting a unique word for establishing the frame synchronization. Supposing that this unique word for establishing the frame synchronization is $(S_{19}S_{18}S_{17} \ldots S_1S_0)$, $(S_{19}S_{18}S_{17} \ldots S_1S_0)=$ (11101100110100101000) is made.

The TMCC data TD is data of 128 symbols indicating the multiplexing configuration or the like of the modulation technique multiplexed by the time sharing.

The super frame identification pattern W2 is one for identifying the head of the super frame made of eight frames, and uses specified 20 bits in the pattern of 32 symbols. Furthermore, in the header part HE corresponding to seven frames other than the head, a super frame identification pattern W3 made by reversing the super frame identification pattern W2 is included.

The main signal part 30 is subjected to the modulation by any one or more of modulation technique among TC8PSK modulation, QPSK modulation, and BPSK modulation, and is sent by the way of time sharing by the frame as a unit.

The burst symbol part 31 is a PN (Pseudo Noise) signal which is subjected to the modulation by the BPSK modulation technique and is reset for each frame.

Figure 2:
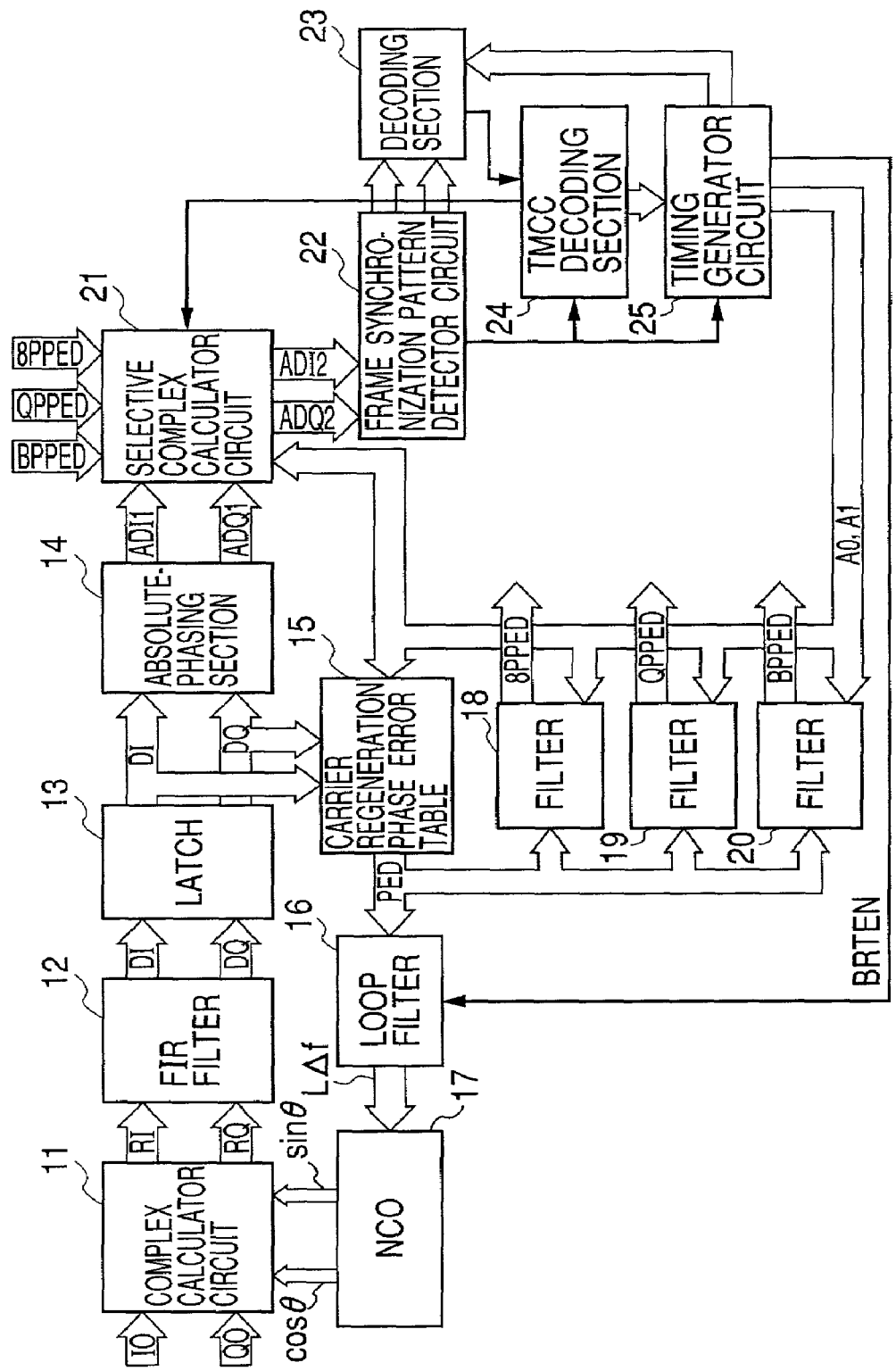
FIG. 2 is a drawing indicating the structure of an apparatus for receiving BS digital broadcast according to an embodiment of this invention.
Figure 3:
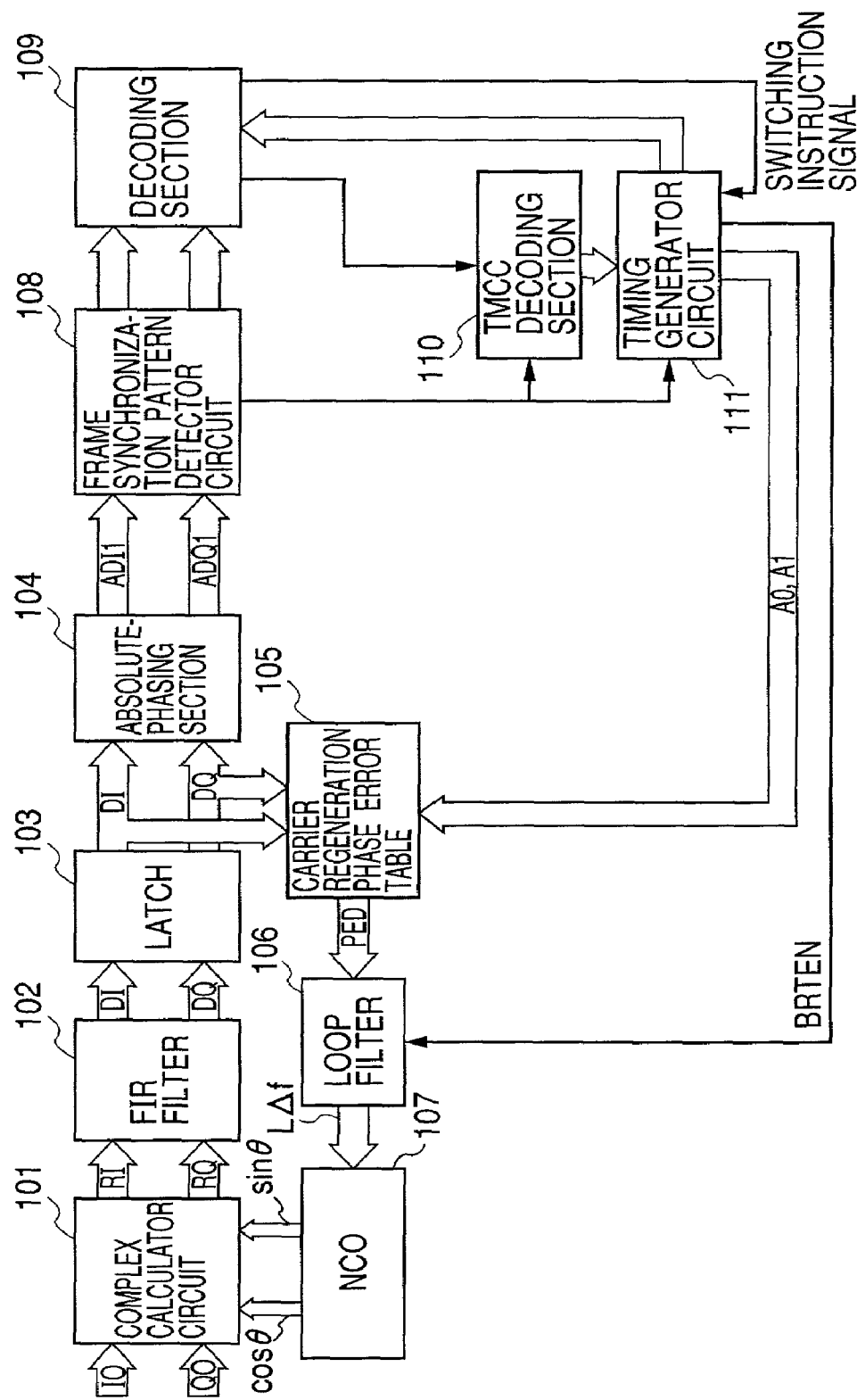
FIG. 3 is a drawing indicating the structure of a conventional apparatus for receiving BS digital broadcast.
Figure 4:
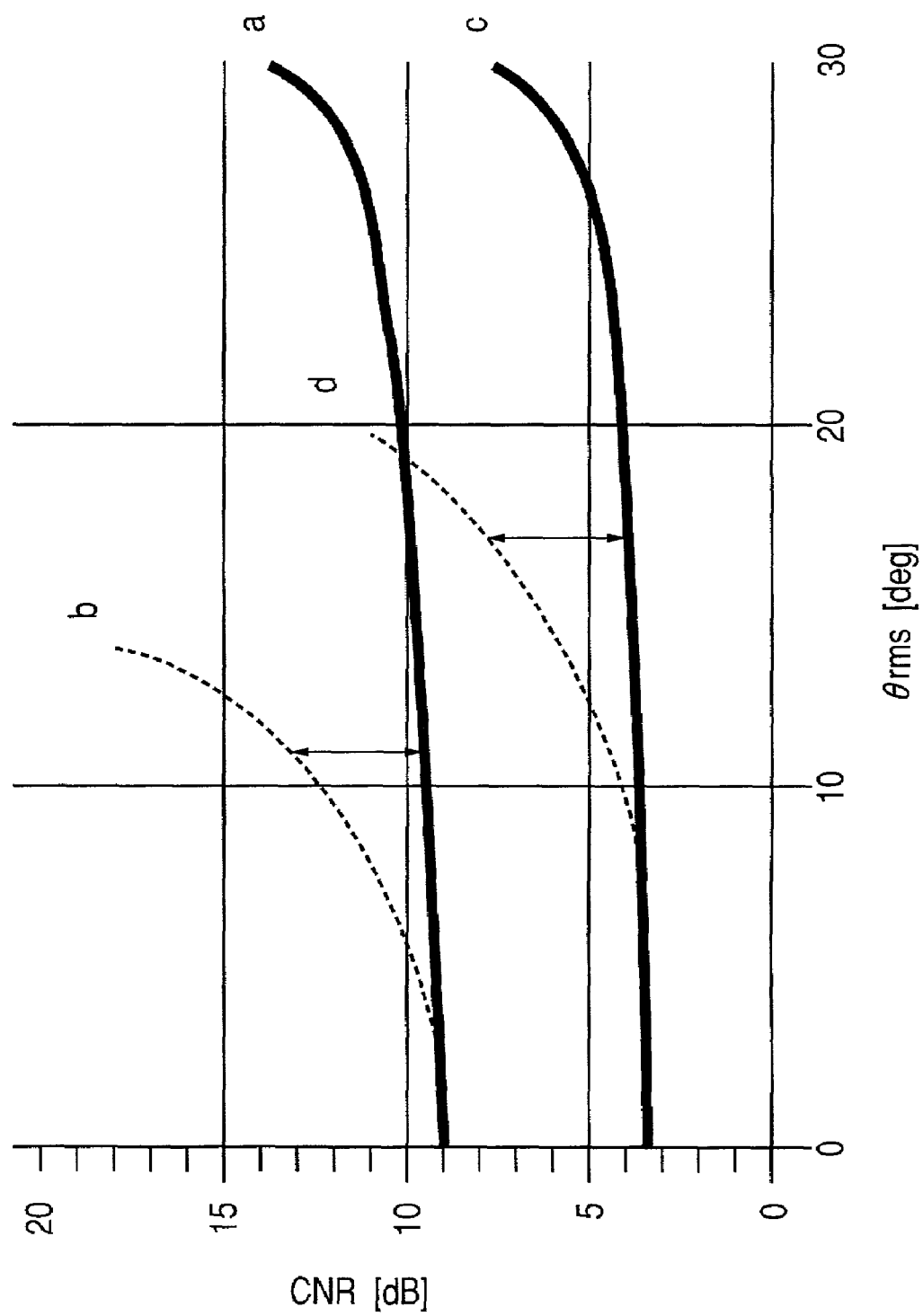
FIG. 4 is a drawing for explaining the fluctuation of the limit CNR to the phase noise characteristic the ODU because of the switching of the receiving operation of the conventional apparatus for receiving BS digital broadcast.

In order to receive the BS digital broadcast using such a hierarchical modulation technique, as indicated in FIG. 2, the apparatus for receiving BS digital broadcast according to the embodiment of this invention includes a complex calculator circuit 11, an FIR filter 12, a latch 13, an absolute-phasing section 14, a carrier regeneration phase error table 15, a loop filter 16, an NCO (numerical control frequency oscillator) 17, first to third filters 18 to 20, a selective complex calculator circuit 21, a frame synchronization pattern detector circuit 22, a decoding section 23, a TMCC decoding section 24, and a timing generator circuit 25.

The complex calculator circuit 11 is made of a reversing circuit and a multiplier circuit or the like, and performs calculation for eliminating the phase error and the frequency error included in the I signal I0 and the Q signal Q0.

More particularly, the complex calculator circuit 11 applies the reversing processing or the like to the sine wave data sin θ received from the NCO 17, and after that, multiplies it with the I signal I0 and Q signal Q0 to generate the I signal RI and Q signal RQ.

The complex calculator circuit 11 sends the generated I signal RI and Q signal RQ to the FIR filter 12.

The FIR filter 12 is a roll off filter for limiting the pass band of the I signal RI and Q signal RQ received from the complex calculator circuit 11. The I signal DI and Q signal DQ passing through the FIR filter 12 are latched by the latch 13, and are supplied to the absolute-phasing section 14 and the carrier regeneration phase error table 15.

The absolute-phasing section 14 is one for absolute-phasing the I signal DI and Q signal DQ supplied from the latch 13 to generate the I signal ADI1 and Q signal ADQ1, and sends the generated the I signal ADI1 and Q signal ADQ1 to the selective complex calculator circuit 21.

The carrier regeneration phase error table 15 identifies the signal point position in the signal space (I-Q vector plane) on the basis of the I signal DI and Q signal DQ supplied from the latch 13, and generates a phase error signal PED indicating the phase error of the phase indicated by the signal point position and the absolute phase.

The phase error signal PED generated by the carrier regeneration phase error table 15 is smoothed in the loop filter 16, and is supplied to the NCO 17 as a phase adjustment signal LΔf. Furthermore, the phase error signal PED is smoothed in the first to third filters 18 to 20, and after that, it is supplied to the selective complex calculator circuit 21.

The NCO 17 generates the sine wave data sin θ and cosine wave data cos θ that are waveform data to be accumulated corresponding to the phase adjustment signal LΔf supplied from the loop filter 16, and sends them to the complex calculator circuit 11.

Each of the first to third filters 18 to 20 is one for smoothing the phase error signal PED sent from the carrier regeneration phase error table 15.

The first filter 18 filters the phase error signal PED sent from the carrier regeneration phase error table 15 during the period when the TC8PSK modulation is applied to the received signal to generate an eight-phase phase error signal 8PPED. The first filter 18 sends the generated eight-phase phase error signal 8PPED to the selective complex calculator circuit 21, in turn.

The second filter 19 filters the phase error signal PED sent from the carrier regeneration phase error table 15 during the period when the QPSK modulation is applied to the received signal to generate a four-phase phase error signal QPPED. The second filter 19 sends the generated four-phase phase error signal QPPED to the selective complex calculator circuit 21, in turn.

The third filter 20 filters the phase error signal PED sent from the carrier regeneration phase error table 15 during the period when the BPSK modulation is applied to the received signal to generate a two-phase phase error signal BPPED. The third filter 20 sends the generated two-phase phase error signal BPPED to the selective complex calculator circuit 21, in turn.

The selective complex calculator circuit 21 performs the calculation for adjusting the phase of a signal point indicated by the I signal ADI1 and Q signal ADQ1 received from the absolute-phasing section 14.

More particularly, the selective complex calculator circuit 21 identifies the modulation technique (TC8PSK, or QPSK, or BPSK) applied to the received signal by the modulation identification signals A0, A1 received from the timing generator circuit 25. The selective complex calculator circuit 21 generates the I signal ADI2 and Q signal ADQ2 in which the phase of a signal point is shifted by the phase corresponding to the eight-phase phase error signal 8PPED, or the four-phase phase error signal QPPED, or the two-phase phase error signal BPPED received from the first to third filters 18 to 20 according to the identified modulation technique. The selective complex calculator circuit 21 sends the generated I signal ADI2 and Q signal ADQ2 to the frame synchronization pattern detector circuit 22.

Furthermore, when the TMCC decoding section 24 cannot decode the TMCC data TD, the selective complex calculator circuit 21 sends the I signal ADI1 and Q signal ADQ2 received from the absolute-phasing section 14 to the frame synchronization pattern detector circuit 22 as the I signal ADI2 and Q signal ADQ2 as they are, respectively.

Furthermore, even if the absolute-phasing section 14 is provided between the selective complex calculator circuit 21 and the frame synchronization pattern detector circuit 22, there is an effect similar to that in the case where it is provided between the latch 13 and the selective complex calculator circuit 21.

The frame synchronization pattern detector circuit 22 is one for detecting a frame synchronization pattern WI included in the digital signal transmitted by using the hierarchical modulation technique, and sends a signal indicating the timing at which the frame synchronization pattern W1 is detected to the TMCC decoding section 24 and the timing generator circuit 25.

Furthermore, the frame synchronization pattern detector circuit 22 sends a signal indicating whether the detected frame synchronization pattern W1 is reversed or not to the absolute-phasing section 14.

Furthermore, the frame synchronization pattern detector circuit 22 sends the I signal ADI2 and Q signal ADQ2 received from the selective complex calculator circuit 21 to the decoding section 23.

The decoding section 23 is one for decoding the digital signal for BS digital broadcast, on the basis of the I signal ADI2 and Q signal ADQ2 received from the frame synchronization pattern detector circuit 22. At this moment, the decoding section 23 extracts the TMCC data TD in the digital signal, and sends that to the TMCC decoding section 24.

The TMCC decoding section 24 is one for decoding the TMCC data TD received from the decoding section 23 to identify the frame structure (multiplexing structure) of the received signal. The TMCC decoding section 24 sends a signal for giving notice of the identified frame structure to the timing generator circuit 25. Furthermore, the TMCC decoding section 24 sends a signal for giving notice of whether the TMCC data TD has been decoded or not to the selective complex calculator circuit 21.

The timing generator circuit 25 generates modulation identification signals A0, A1 for identifying the modulation technique (TC8PSK, or QPSK, or BPSK) applied to the received signal, on the basis of the signal received from the frame synchronization circuit pattern detector circuit 22 and the TMCC decoding section 24. The timing generator circuit 25 sends the generated modulation identification signals A0, A1 to the selective complex calculator circuit 21 and the first to third filters 18 to 20.

Furthermore, the timing generator circuit 25 generates a timing signal BRTEN which instructs the switching of the filtering/holding operation for performing burst-receiving, and sends it to the loop filter 16.

Furthermore, the timing generator circuit 25 generates a signal which controls the de-mapping operation or the like at the time of restoring the digital signal, and sends it to the decoding section 23.

The operation of the apparatus for receiving BS digital broadcast according to the embodiment of this invention will be described below.

This apparatus for receiving BS digital broadcast makes the stable receiving operation possible, by deviating the phase of a signal point indicated by the I signal ADI1 and Q signal ADQ1 which are absolute-phased after the phase error or the frequency error have been eliminated by the carrier regenerating loop by the phase corresponding to the modulation technique applied to the received signal and the phase error amount.

In the case of this apparatus for receiving BS digital broadcast, a complex calculator circuit 11, an FIR filter 12, a latch 13, a carrier regeneration phase error table 15, a loop filter 16, and an NCO 17 make up a carrier regenerating loop for eliminating the frequency error of the carrier included in the I signal I0 and Q signal Q0 of the base band received from the quadrature detector or the like.

That is, first, the complex calculator circuit 11 receives the I signal I0 and Q signal Q0 obtained by subjecting the BS-IF signal made by down converting the received radio wave by the ODU (not indicated in the drawing) or the like to the quasi-synchronous detection with the quadrature detector (not indicated in the drawing) or the like.

The complex calculator circuit 11 performs the calculation indicated in Equation 1 by using the sine wave data sin θ and the cosine wave data cos θ received from the NCO 17, and generates the I signal RI and the Q signal RO in which the phases are adjusted.

$$RI = I0 \times \cos\theta - Q0 \times \sin\theta$$
$$RQ = I0 \times \sin\theta + Q0 \times \cos\theta \quad \text{[Equation 1]}$$

The complex calculator circuit 11 inputs the generated I signal RI and Q signal RQ in the FIR filter 12 and limits the band, and makes them the I signal DI and Q signal DQ. The I signal DI and Q signal DQ are latched by the latch 13, and are supplied to the absolute-phasing section 14 and the carrier regeneration phase error table 15.

The carrier regeneration phase error table 15 identifies the signal point position in the signal space on the basis of the I signal DI and Q signal DQ supplied from the latch 13, and generates a phase error signal PED indicating the phase error of the phase indicated by the signal point position and the absolute phase.

The carrier regeneration phase error table 15 sends the generated phase error signal PED to the loop filter 16.

The loop filter 16 generates a phase adjustment signal LΔf made by smoothing the phase error signal PED while switching the filtering/holding operation according to the timing signal BRTEN sent from the timing generator circuit 25, and supplies it to the NCO 17.

The NCO 17 generates the sine wave data sin θ and the cosine wave data cos θ to be accumulated (oscillated) corresponding to the phase adjustment signal LΔf, and sends them to the complex calculator circuit 11.

When the carrier is regenerated by such a carrier regenerating loop, and the phase synchronization is established, it becomes possible to detect the frame synchronization pattern W1 by the frame synchronization pattern detector circuit 22, on the basis of the I signal ADI2 and the Q signal ADQ2 outputted from the selective complex calculator circuit 21 through the absolute-phasing section 14 from the latch 13.

Furthermore, at this moment, the decoding of the TMCC data TD by the TMCC decoding section 24 has not been performed yet, and therefore, the selective complex calculator circuit 21 sends the I signal ADI1 and the Q signal ADQ1 received from the absolute-phasing section 14 to the frame synchronization pattern detector circuit 22 as they are as the I signal ADI2 and the Q signal ADQ2.

Here, various types of modulation signals corresponding to the hierarchical modulation technique used in the BS digital broadcast are absolute-phased on the transmitting side. Accordingly, the frame synchronization pattern detector circuit 22 can judge whether the receiving is performed by the absolute phase or by the phase rotated by 180 degrees, by detecting the frame synchronization pattern W1 transmitted by using the BPSK modulation technique.

That is, when the receiving is performed by the absolute phase, the frame synchronization pattern detector circuit 22 detects the frame synchronization pattern W1 as $(S_{19}S_{18}S_{17} \ldots S_1S_0) = (11101100110100101000)$.

On the other hand, when the receiving is performed by the phase rotated by 180 degrees, the frame synchronization pattern detector circuit 22 detects the frame synchronization pattern W1 as $(S_{19}S_{18}S_{17} \ldots S_1S_0) = (00010011001011010111)$ where the value of each digit is reversed.

The frame synchronization pattern detector circuit 22 sends a signal indicating whether the value of each digit of the detected frame synchronization pattern W1 is reversed or not, that is, whether the receiving is performed by the absolute phase or by the phase rotated by 180 degrees, to the absolute-phasing section 14.

When it is judged that the receiving is performed by the absolute phase from the signal received from the frame synchronization pattern detector circuit 22, the absolute-phasing section 14 sends the I signal DI and the Q signal DQ supplied from the latch 13 to the selective complex calculator circuit 21 as they are as the I signal ADI1 and the Q signal ADQ2.

On the other hand, when it is judged that the receiving is performed by the phase rotated by 180 degrees from the signal received from the frame synchronization pattern detector circuit 22, the absolute-phasing section 14 makes the phase of a signal point indicated by the I signal DI and the Q signal DQ supplied from the latch 13 the absolute phase, and sends the I signal ADI1=(−1)×DI and the Q signal ADQ1=(−1)×DQ to the selective complex calculator circuit 21.

Thus, when the frame synchronization pattern detector circuit 22 detects the frame synchronization pattern W1 and establishes the frame timing, the positions in terms of time series of the frame synchronization pattern WI, the TMCC data TD, the super frame identification pattern W2 (or W3), and the burst symbol part 31 become clear. The frame synchronization pattern detector circuit 22 sends a signal indicating the timing at which the frame synchronization pattern W1 is detected to the TMCC decoding section 24 and the timing generator circuit 25.

The TMCC decoding section 24 identifies the timing for receiving the TMCC data, from the position in terms of time series of the frame synchronization pattern W1 identified by the signal received from the frame synchronization pattern detector circuit 22, and obtains the reception data from the decoding section 23 at the identified timing. The TMCC decoding section 24 decodes the TMCC data TD from the reception data obtained from the decoding section 23, and identifies the frame structure (multiplexing structure) of the received signal. The TMCC decoding section 24 sends the signal for giving notice of the identified frame structure to the timing generator circuit 25.

The timing generator circuit 25 generates the modulation identification signals A0, A1 for identifying the modulation technique (TC8PSK, or QPSK, or BPSK) applied to the received signal, on the basis of the signal received from the frame synchronization pattern detector circuit 22 and the TMCC decoding section 24.

Furthermore, when the phase error signal PED is generated, the carrier regeneration phase error table 15 sends that to the first to third filters 18 o 20, too.

Each of the first to third filters 18 to 20 identifies the modulation technique (TC8PSK, or QPSK, or BPSK) applied to the received signal, by the modulation identification signals A0, A1 received from the timing generator circuit 25, and filters the phase error signal PED according to the identified modulation technique.

That is, when the identified modulation technique is TC8PSK, the first filter 18 filters the phase error signal PED and generates an eight-phase phase error signal 8PPED, and sends it to the selective complex calculator circuit 21.

On the other hand, when the identified modulation technique is QPSK, the second filter 19 filters the phase error signal PED and generates a four-phase phase error signal QPPED, and sends it to the selective complex calculator circuit 21.

Furthermore, on the other hand, when the identified modulation technique is BPSK, the third filter 20 filters the phase error signal PED and generates a two-phase phase error signal BPPED, and sends it to the selective complex calculator circuit 21.

The selective complex calculator circuit 21 displaces the phase of a signal point indicated by the I signal ADI1 and the Q signal ADQ1 generated by absolute-phasing the I signal DI and the Q signal DQ by the absolute-phasing section 14, by the phase corresponding to the phase error signal (eight-phase phase error signal 8PPED, or four-phase phase error signal QPPED, or two-phase phase error signal BPPED) generated by the filtering of the first to third filters 18 to 20.

At this moment, the selective complex calculator circuit 21 selects a phase error signal corresponding to the modulation technique identified from the modulation identification signals A0, A1 received from the timing generator circuit 25.

That is, when the modulation technique identified from the modulation identification signals A0, A1 is TC8PSK, the selective complex calculator circuit 21 selects the eight-phase phase error signal 8PPED received from the first filter 18.

On the other hand, when the modulation technique identified from the modulation identification signals A0, A1 is QPSK, the selective complex calculator circuit 21 selects the four-phase phase error signal QPPED received from the second filter 19.

Furthermore, on the other hand, when the modulation technique identified from the modulation identification signals A0, A1 is BPSK, the selective complex calculator circuit 21 selects the two-phase phase error signal BPPED received from the third filter 20.

More particularly, when the selective complex calculator circuit 21 selects the eight-phase phase error signal 8PPED, it generates the I signal ADI2 and the Q signal ADQ2 in which the phase of a signal point indicated by the I signal ADI1 and the Q signal ADQ1 is shifted, by performing such a calculation as indicated in Equation 2 where $\Theta_1$=8PPED.

$$ADI2 = ADI1 \times \cos \Theta_1 \times ADQ1 \times \sin \Theta_1$$

$$ADQ2 = ADI1 \times \sin \Theta_1 + ADQ1 \times \cos \Theta_1 \quad \text{[Equation 2]}$$

On the other hand, when the selective complex calculator circuit 21 selects the four-phase phase error signal QPPED, it generates the I signal ADI2 and the Q signal ADQ2 in which the phase of a signal point indicated by the I signal ADI1 and the Q signal ADQ1 is shifted, by performing such a calculation as indicated in Equation 3 where $\Theta_2$=QPPED.

$$ADI2 = ADI1 \times \cos \Theta_2 - ADQ1 \times \sin \Theta_2$$

$$ADQ2 = ADI1 \times \sin \Theta_2 + ADQ1 \times \cos \Theta_2 \quad \text{[Equation 3]}$$

Furthermore, on the other hand, when the selective complex calculator circuit 21 selects the two-phase phase error signal BPPED, it generates the I signal ADI2 and the Q signal ADQ2 in which the phase of a signal point indicated by the I signal ADI1 and the Q signal ADQ1 is shifted, by performing such a calculation as indicated in Equation 4 where $\Theta_3$=BPPED.

$$ADI2 = ADI1 \times \cos \Theta_3 - ADQ1 \times \sin \Theta_3$$

$$ADQ2 = ADI1 \times \sin \Theta_3 + ADQ1 \times \cos \Theta_3 \quad \text{[Equation 4]}$$

Thus, the selective complex calculator circuit 21 shifts the phase of the signal point out of the carrier regenerating loop and corrects it. Furthermore, this apparatus for receiving BS digital broadcast performs burst receiving at all timed regardless of whether the CNR is large (high CNR) or in the middle degree (medium CNR) and detects the phase error, and regenerates the carrier and establishes the phase synchronization. That is, the timing generator circuit 25 instructs the switching of the filtering/holding operation by generating the timing signal BPTEN and sending it to the loop filter 16, and regenerates the carrier.

Consequently, it does not occur for the carrier regeneration to break down or for the frame synchronization to be off, and a stable receiving operation becomes possible. Furthermore, it possible to reduce the effect on the error rate (BER) in the TC8PSK modulation section, the QPSK modulation section, and the BPSK modulation section because of the phase noise of the ODU, to a degree equal to that at the time of continuous receiving, and a stable receiving operation becomes possible.

As described above, according to this invention, the phase of the signal point is corrected out of the carrier regenerating loop, and the burst receiving is performed regardless of the magnitude of the CNR and the carrier is regenerated, and consequently, it is possible to eliminate the fluctuation of the error rate (BER) because of the phase noise of the ODU.

Furthermore, the switching of the receiving operation becomes unnecessary, and no hysteresis is caused, and a stable receiving operation becomes possible.

This invention is not limited to the apparatus for receiving BS digital broadcast, and is applicable for any receiving apparatus, which receives the digital signal transmitted by using the hierarchical modulation technique where the main signal is subjected to the time sharing by the frame unit by using two or more modulation techniques including the BPSK modulation among the 8PSK modulation, the QPSK modulation, and the BPSK modulation, and the TMCC data subjected to the BPSK modulation and the burst symbol are inserted.

INDUSTRIAL APPLICABILITY

As described above, according to this invention, the phase of the signal point is corrected out of the carrier regenerating loop, and the burst receiving is performed regardless of the magnitude of the CNR and the carrier is regenerated, and consequently, it is possible to eliminate the hysteresis in the switching of the receiving operation, and a stable receiving operation becomes possible.

The invention claimed is:

1. An apparatus for receiving BS digital broadcast, which regenerates a carrier by a carrier regeneration loop and establishes phase synchronization to decode a PSK modulation signal regenerated from a modulated signal to a digital signal, comprising:
   absolute-phasing means for absolute-phasing a PSK modulation signal in which the phase of a signal point is adjusted by a carrier regenerated by said carrier regenerating loop;
   wherein a phase of a signal point indicated by the PSK modulation signal absolute-phased by said absolute-phasing means is shifted by a phase determined on the basis of the type of PSK modulation technique applied to a received signal and a phase error contained in the PSK modulation signal, then the digital signal is decoded, and the carrier is regenerated on the basis of a phase error detected by performing burst receiving only in a predetermined signal interval.

2. An apparatus for receiving BS digital broadcast, comprising:
   carrier regenerating means for regenerating a carrier by detecting a phase error contained in a PSK modulation signal regenerated from a modulated signal;
   absolute-phasing means for absolute-phasing a PSK modulation signal in which the phase of a signal point is adjusted by a carrier regenerated by said carrier regenerating means;
   phase shift means for shifting the phase of a signal point indicated by a PSK modulation signal absolute-phased by said absolute-phasing means by a phase determined on the basis of the type of PSK modulation technique applied to a received signal and a phase error contained in the PSK modulation signal; and
   decoding means for decoding a digital signal from a PSK modulation signal in which the phase of a signal point is shifted by said phase shift means,
   wherein said carrier regenerating means is adapted to regenerate a carrier on the basis of a phase error detected by performing burst receiving only in a predetermined signal interval.

3. The apparatus for receiving BS digital broadcast according to claim 2,
   said carrier regenerating means comprises:
   a waveform data generator circuit for generating waveform data indicating the regenerated carrier;
   a complex calculator circuit for executing a complex calculation of the waveform data generated by said waveform data generator circuit and a PSK modulation signal regenerated from the modulated signal;
   a band limiting filter for limiting a band of a PSK modulation signal in which the phase of a signal point is adjusted by the complex calculation of said complex calculator circuit;
   a latch circuit for latching a PSK modulation signal in which the band is limited by said band limiting filter;
   an error detector circuit for detecting a phase error by comparing the phase of a signal point indicated by a PSK modulation signal latched by said latch circuit with an absolute phase; and
   a loop filter for applying smoothing processing to an error signal indicating the magnitude of a phase error detected by said error detector circuit to supply the smoothed error signal to said waveform data generator circuit.

4. The apparatus for receiving BS digital broadcast according to claim 3, comprising:
   a plurality of filter circuits for filtering the error signal indicating the magnitude of the phase error detected by said error detector circuit, only in the signal interval corresponding to the type of the PSK modulation technique applied to a received signal,
   wherein said phase shift means shifts the phase of a signal point indicated by the PSK modulation signal, by a phase corresponding to the error signal filtered by said plurality of filter circuits.

5. The apparatus for receiving BS digital broadcast according to claim 4,
   said decoding means comprises:
   control data decoding means for decoding data indicating the multiplex structure of a frame formed by the decoded digital signal from a PSK modulation signal; and
   identification signal generating means for generating a modulation identification signal indicating the PSK modulation technique applied to a received signal identified by data decoded by said control data decoding means,
   wherein said plurality of filter circuits respond to the modulation identification signal generated by said identification signal generating means and identify the type of the PSK modulation technique applied to a received signal, and
   wherein said phase shift means selects the error signal filtered by said plurality of filter circuits in accordance with the PSK modulation technique identified from the modulation identification signal generated by said identification signal generating means so as to shift the phase of a signal point indicated by the PSK modulation signal, by a phase corresponding to the selected error signal.

6. The apparatus for receiving BS digital broadcast according to any one of claims 2 to 5, comprising:
pattern detecting means for detecting a frame synchronization pattern from the PSK modulation signal in which the phase is shifted by said phase shift means,
wherein said absolute-phasing means absolute-phases the PSK modulation signal in accordance with whether or not the frame synchronization pattern detected by said pattern detecting means is reversed.

7. A method for receiving BS digital broadcast for regenerating a carrier by a carrier regeneration loop and establishing synchronization, to decode a digital signal from a PSK modulation signal, the method comprising the step of: absolute-phasing a PSK modulation signal in which the phase of a signal point is adjusted by a carrier regenerated by said carrier regeneration loop;
wherein the phase of a signal point indicated by the PSK modulation signal absolute-phased in the step of absolute-phasing a PSK modulation signal is shifted by a phase determined on the basis of the type of a PSK modulation technique applied to a received signal and a phase error contained in the PSK modulation signal, and then, the digital signal is decoded, and the carrier is regenerated on the basis of a phase error detected by performing burst receiving only in a predetermined signal interval.

* * * * *